United States Patent
Isobe

(10) Patent No.: US 11,194,309 B2
(45) Date of Patent: Dec. 7, 2021

(54) ABNORMALITY DETECTION DEVICE OF MACHINE TOOL

(71) Applicant: FANUC CORPORATION, Yamanashi (JP)

(72) Inventor: Gaku Isobe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/439,047

(22) Filed: Jun. 12, 2019

(65) Prior Publication Data

US 2020/0019140 A1 Jan. 16, 2020

(30) Foreign Application Priority Data

Jul. 10, 2018 (JP) .............................. JP2018-130876

(51) Int. Cl.
G05B 19/40 (2006.01)
G05B 19/4065 (2006.01)

(52) U.S. Cl.
CPC .................... *G05B 19/4065* (2013.01); *G05B 2219/37228* (2013.01)

(58) Field of Classification Search
CPC ................................................. G05B 19/4065
USPC ........................................................ 700/175
See application file for complete search history.

(56) References Cited

U.S. PATENT DOCUMENTS

| 4,442,493 A | * | 4/1984 | Wakai | ....................... G01N 3/58 408/11 |
| 6,662,073 B1 | * | 12/2003 | Fujishima | .......... G05B 19/4069 700/109 |
| 2006/0142893 A1 | * | 6/2006 | Yasugi | ............... G05B 19/4065 700/174 |

(Continued)

FOREIGN PATENT DOCUMENTS

| JP | H07051997 A | 2/1995 |
| JP | H09-150347 A | 6/1997 |

(Continued)

OTHER PUBLICATIONS

An Office Action; "Notification of Reasons for Refusal," dated by the Japanese Patent Office on Jun. 2, 2020, which corresponds to Japanese Patent Application No. 2018-130876 and is related to U.S. Appl. No. 16/439,047 with English language translation.

*Primary Examiner* — Hien D Khuu
(74) *Attorney, Agent, or Firm* — Studebaker & Brackett PC

(57) ABSTRACT

An abnormality detection device of a machine tool including a spindle and a feed axis and includes: a load monitoring unit that monitors a load of the spindle or the feed axis; a machining state determination unit that determines that the machine tool is in a machining state when the load of the spindle or the feed axis is equal to or larger than a threshold; a storage unit that stores shape data of the work and shape data of the tool in advance; an interfering area calculation unit that calculates an interfering area in which the tool interferes with the work based on the shape data of the work (Continued)

and the shape data of the tool; and an abnormality detection unit that detects an abnormality in the machine tool by comparing a position of the tool in relation to the work when it is determined that the machine tool is in the machining state with the calculated interfering area.

4 Claims, 3 Drawing Sheets

(56) References Cited

U.S. PATENT DOCUMENTS

| | | | |
|---|---|---|---|
| 2013/0090755 A1* | 4/2013 | Kiryu | B23Q 17/2461 700/186 |
| 2013/0325163 A1* | 12/2013 | Katougi | G05B 19/18 700/162 |
| 2017/0090453 A1* | 3/2017 | Endou | B23C 3/00 |
| 2017/0124697 A1* | 5/2017 | Ando | G06K 9/00536 |
| 2017/0308055 A1* | 10/2017 | Hoshino | G05B 19/409 |
| 2017/0322540 A1* | 11/2017 | Moto | H02H 7/0851 |
| 2018/0129190 A1* | 5/2018 | Hoshino | G05B 19/416 |
| 2018/0307200 A1* | 10/2018 | Boye | G05B 19/404 |

FOREIGN PATENT DOCUMENTS

| | | | |
|---|---|---|---|
| JP | H10286743 A | | 10/1998 |
| JP | 2000-84794 | * | 3/2000 |
| JP | 2002-175104 A | | 6/2002 |
| JP | 2006-102923 A | | 4/2006 |
| JP | 2009285792 A | | 12/2009 |
| JP | 2012-254499 A | | 12/2012 |

* cited by examiner

ABNORMALITY DETECTION DEVICE OF MACHINE TOOL

This application is based on and claims the benefit of priority from Japanese Patent Application No. 2018-130876, filed on 10 Jul. 2018, the content of which is incorporated herein by reference.

BACKGROUND OF THE INVENTION

Field of the Invention

The present invention relates to an abnormality detection device of a machine tool that moves a tool or a work to machine the work.

Related Art

As a machine tool, a machine which includes a spindle that rotates a tool or a work and a feed axis that moves the tool or the work and which moves the tool and the work in relation to each other to perform machining of the work is known. In such a machine tool, such an abnormality that a tool and a work or a tool and a jig that fixes a work collide (interfere) with each other and an excessively large load is applied to a spindle or a feed axis may occur.

Due to this, a machine tool has a function of monitoring a load of a spindle and a feed axis, detecting an abnormality in a machine when the load exceeds a threshold for a predetermined period, and generating an alarm or the like to stop the machine (for example, see Patent Documents 1 to 3). In this way, when the collision of a tool and a work or the collision of a tool and a jig occurs, it is possible to detect an abnormality in the machine tool immediately and stop the machine immediately. Due to this, it is possible to suppress or prevent deterioration or destruction of components of a machine such as a spindle and a feed axis.

Patent Document 1: Japanese Unexamined Patent Application, Publication No. 2009-285792
Patent Document 2: Japanese Unexamined Patent Application, Publication No. H10-286743
Patent Document 3: Japanese Unexamined Patent Application, Publication No. H07-051997

SUMMARY OF THE INVENTION

Alternatively, a method of preventing a tool and a work from interfering with each other in a machine tool may be considered. For example, a method of storing the work shape data and the tool shape data in advance and limiting the movable range of the feed axis so that the work or the tool does not enter an interfering area in which the work and the tool interfere with each other may be considered.

However, in the event of an abnormality such as when wrong work shape data or tool shape data is input, when the work or the tool is attached to a wrong position, when a wrong work or tool is attached, or when a destroyed tool is attached, the above-described method may not work properly, and interference between the tool and the work may occur, and the spindle or the feed axis may be deteriorated or destroyed.

An object of the present invention is to provide an abnormality detection device of a machine tool, for detecting an abnormality in the machine tool.

(1) An abnormality detection device (for example, an abnormality detection device 10 to be described later) of a machine tool according to the present invention is a controller of a machine tool (for example, a machine tool 1 to be described later) including a spindle (for example, a spindle 2s to be described later) that rotates a tool or a work and a feed axis (for example, a feed axis 2f to be described later) that moves the tool or the work, including: a load monitoring unit (for example, a load monitoring unit 12 to be described later) that monitors a load of at least one of the spindle and the feed axis; a machining state determination unit (for example, a machining state determination unit 14 to be described later) that determines that the machine tool is in a machining state when the load of at least one of the spindle and the feed axis monitored by the load monitoring unit is equal to or larger than a threshold; a storage unit (for example, a storage unit 16 to be described later) that stores shape data of the work and shape data of the tool in advance; an interfering area calculation unit (for example, an interfering area calculation unit 18 to be described later) that calculates an interfering area in which the tool interferes with the work on the basis of the shape data of the work and the shape data of the tool; and an abnormality detection unit (for example, an abnormality detection unit 20 to be described later) that detects an abnormality in the machine tool by comparing a position of the tool in relation to the work when the machining state determination unit determines that the machine tool is in the machining state or the position of the tool in relation to the work when the machining state determination unit determines that the machine tool is not in the machining state with the interfering area calculated by the interfering area calculation unit.

(2) In the abnormality detection device of the machine tool according to (1), the load monitored by the load monitoring unit may be a load torque value applied to the spindle or the feed axis or a motor driving current value of the spindle or the feed axis.

(3) In the abnormality detection device of the machine tool according to (1) or (2), the abnormality detection unit may detect an abnormality in the machine tool when the position of the tool in relation to the work when the machining state determination unit determines that the machine tool is in the machining state is not in the interfering area calculated by the interfering area calculation unit.

(4) In the abnormality detection device of the machine tool according to (1) or (2), the abnormality detection unit may detect an abnormality in the machine tool when the position of the tool in relation to the work when the machining state determination unit determines that the machine tool is not in the machining state is in the interfering area calculated by the interfering area calculation unit.

According to the present invention, it is possible to detect an abnormality in a machine tool.

DETAILED DESCRIPTION OF THE INVENTION

Figure 1:
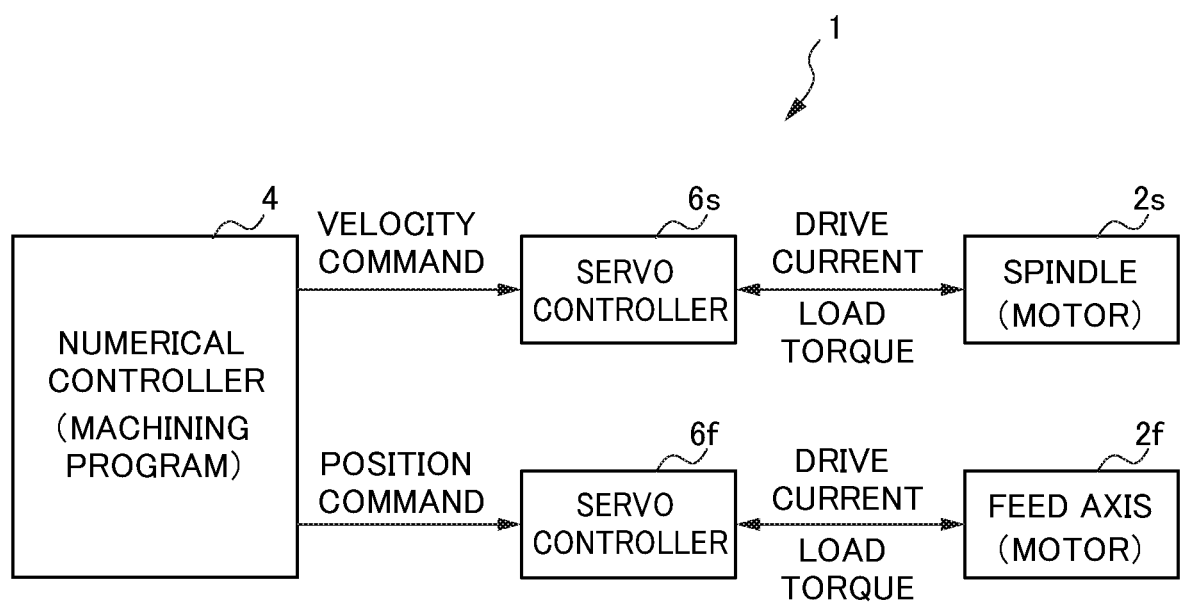
FIG. 1 is a diagram illustrating a schematic configuration of a machine tool according to the present embodiment.

Hereinafter, an example of an embodiment of the present invention will be described with reference to the accompanying drawings. The same or corresponding portions in the respective drawings will be denoted by the same reference numerals.

FIG. 1 is a diagram illustrating a schematic configuration of a machine tool according to the present embodiment. A machine tool 1 illustrated in FIG. 1 includes a spindle 2s that rotates a tool (not illustrated) and a feed axis 2f that moves the tool or a work (not illustrated) and moves the tool and the work in relation to each other to perform machining (for example, cutting) of the work. The machine tool 1 includes a numerical controller 4, servo controllers 6s and 6f, the spindle 2s, and the feed axis 2f.

Although the feed axis 2f includes five or six axes including three linear axes (X, Y, and Z-axes) and two or three rotation axes (two or all of A, B, and C-axes rotating around the X, Y, and Z-axes), one axis among these axes is illustrated representatively in FIG. 1. Moreover, although five or six servo controllers 6f are provided in correspondence to the feed axes 2f, one servo controller among these servo controllers is illustrated representatively in FIG. 1.

The numerical controller 4 calculates a velocity command on the basis of a machining program and controls the spindle 2s via the servo controller 6s. Moreover, the numerical controller 4 calculates a position command for the feed axis on the basis of the machining program and controls the feed axis 2f via the servo controller 6f.

The servo controller 6s performs velocity control and current control using PI control, for example, on the basis of the velocity command from the numerical controller 4 to calculate a drive current of the motor of the spindle 2s. For example, the servo controller 6s calculates (performs velocity control) a torque command of a motor of the spindle 2s on the basis of a velocity error between the velocity command and a velocity feedback detected by an encoder provided in the motor of the spindle 2s, for example, and calculates (performs current control) a drive current of the motor of the spindle 2s on the basis of the torque command.

The servo controller 6f performs position control, velocity control, and current control using PI control, for example, on the basis of the position command from the numerical controller 4 to calculate a drive current of the motor of the feed axis 2f. For example, the servo controller 6f calculates (performs position control) a velocity command on the basis of a position error between the position command and a position feedback detected by an encoder provided in the motor of the feed axis 2f, for example, calculates (performs velocity control) a torque command of the motor of the feed axis 2f on the basis of the velocity command and the velocity feedback detected by the encoder, and calculates (performs current control) a drive current of the motor of the feed axis 2f on the basis of the torque command.

The spindle 2s includes a spindle motor and rotates with the aid of the spindle motor that drives on the basis of the drive current from the servo controller 6s to thereby rotate the tool. The feed axis 2f includes a feed axis motor and rotates with the aid of the feed axis motor that drives on the basis of the drive current from the servo controller 6f to thereby move the tool or the work.

In such a machine tool 1, such an abnormality that the tool and the work or the tool and a jig that fixes the work collide (interfere) with each other and an excessively large load is applied to the spindle 2s or the feed axis 2f may occur. In this regard, for example, a method of storing the work shape data and the tool shape data in advance and limiting the movable range of the feed axis so that the tool does not enter an interfering area in which the tool interferes with the work may be considered.

However, in the event of an abnormality such as when wrong work shape data or tool shape data is input, when the work or the tool is attached to a wrong position, when a wrong work or tool is attached, or when a destroyed tool is attached, the above-described method may not work properly, and interference between the tool and the work may occur, and the spindle or the feed axis may be deteriorated or destroyed. Due to this, the machine tool 1 includes an abnormality detection device to be described later.

Figure 2:
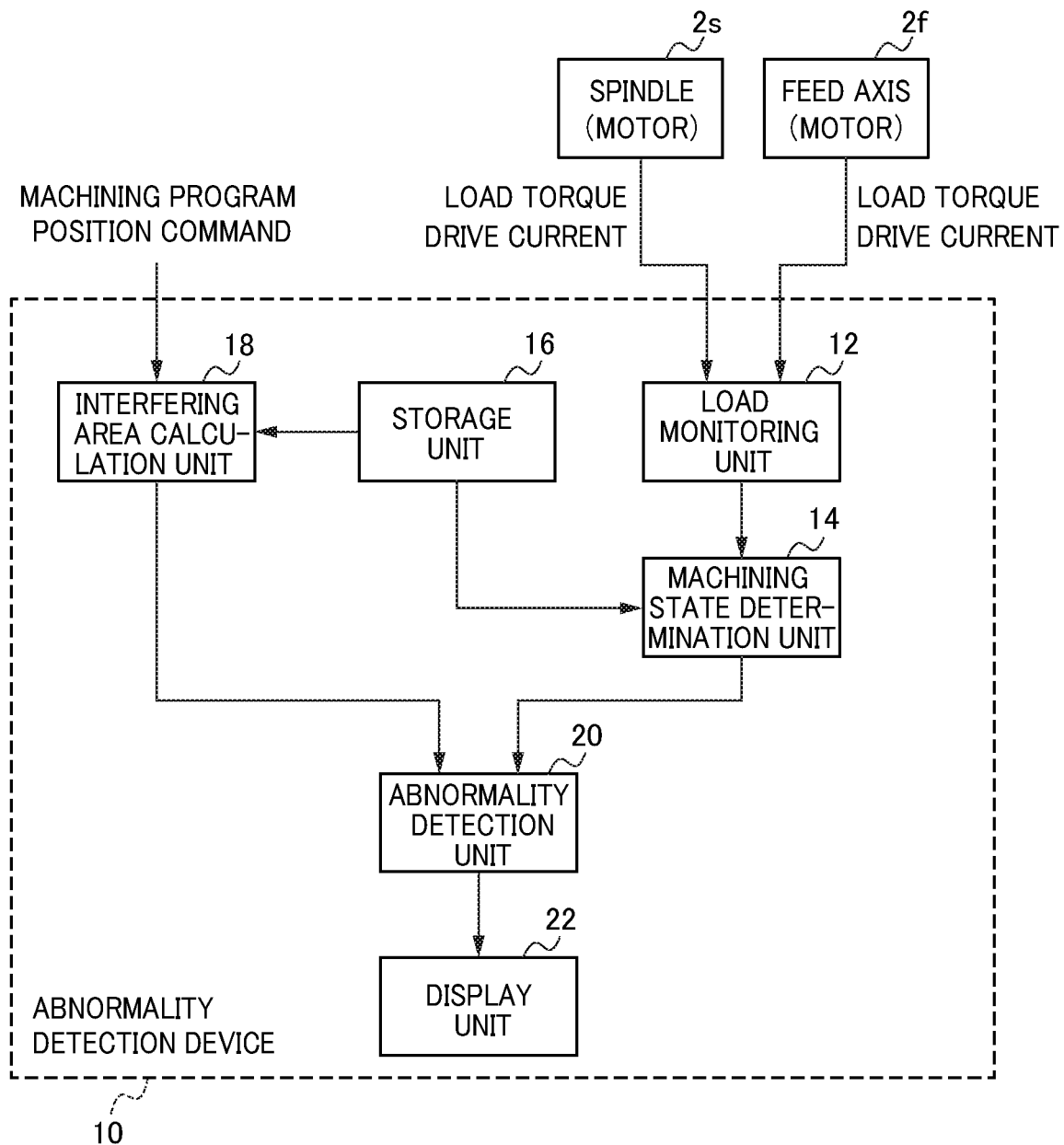
FIG. 2 is a diagram illustrating a configuration of an abnormality detection device of a machine tool according to the present embodiment.

FIG. 2 is a diagram illustrating a configuration of an abnormality detection device of a machine tool according to the present embodiment. The abnormality detection device 10 illustrated in FIG. 2 compares the position (for example, a machine coordinate) of the tool in relation to the work when it is determined that the machine tool 1 is in the machining state on the basis of the load of the spindle 2s and the feed axis 2f with an interfering area (for example, a machine coordinate) of the tool in relation to the work calculated on the basis of the work shape data and the tool shape data stored in advance and detects an abnormality in the machine tool 1 when there is a contradiction in the comparison result. Moreover, the abnormality detection device 10 displays an alarm or a message when an abnormality in the machine tool 1 is detected. The abnormality detection device 10 includes a load monitoring unit 12, a machining state determination unit 14, a storage unit 16, an interfering area calculation unit 18, an abnormality detection unit 20, and a display unit 22.

The abnormality detection device 10 may be provided in the numerical controller 4 illustrated in FIG. 1 and may be provided in the servo controllers 6s and 6f, and may be provided in another controller different from the numerical controller 4 and the servo controllers 6s and 6f. Moreover, the load monitoring unit 12, the machining state determination unit 14, the storage unit 16, the interfering area calculation unit 18, the abnormality detection unit 20, and the display unit 22 of the abnormality detection device 10 may be provided separately in any one of the numerical controller 4, the servo controllers 6s and 6f, and another controller. Moreover, the abnormality detection device 10 may be provided so as to perform abnormality detection of a plurality of machine tools that perform the same machining.

The load monitoring unit 12 monitors the load applied to the spindle 2s and the feed axis 2f. For example, the load monitoring unit 12 may monitor the load torque values of the spindle 2s and the feed axis 2f as a load and may monitor the driving current values of the motors of the spindle 2s and the feed axis 2f. The load monitoring unit 12 is a servo amplifier that obtains current feedbacks of the motors of the spindle 2s and the feed axis 2f, for example.

Figure 3:
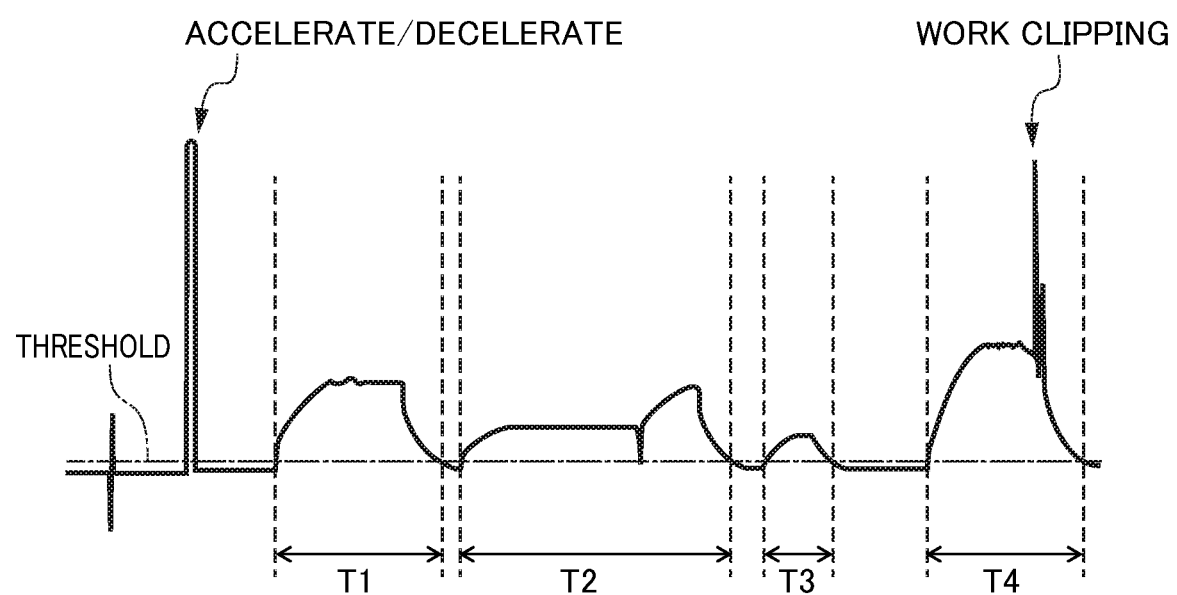
FIG. 3 is an example of a timing chart of a load torque monitored by a load monitoring unit.

The machining state determination unit 14 determines that the machine tool 1 is in a machining state when the load (a load torque value or a driving current value) of at least one of the spindle 2s and the feed axis 2f monitored by the load monitoring unit 12 is equal to or larger than a threshold stored in the storage unit 16 to be described later for a predetermined period or more. FIG. 3 illustrates an example of a timing chart of the load torque monitored by the load monitoring unit 12. In FIG. 3, it is determined that the machine tool 1 is in the machining state in periods T1, T2, T3, and T4 in which the load torque is equal to or larger than the threshold for a predetermined period or more. In the present embodiment, since a period from a rising edge of the load torque to a time point at which a predetermined period has elapsed after the load torque reached the threshold is not determined as a machining state, the determination result may be corrected so that this period is also determined as a machining state.

The storage unit 16 stores the threshold for determining a machining state of the machine tool 1. This threshold is set to the load applied to the spindle 2s or the feed axis 2f during machining. Moreover, the storage unit 16 stores the shape data of the work and the shape data of the tool in advance. The storage unit 16 is a rewritable memory such as EEPROM, for example.

The interfering area calculation unit 18 calculates an interfering area (for example, a machine coordinate) in which the tool interferes with the work on the basis of the work shape data and the tool shape data stored in the storage unit 16 and position command information (for example, a machine coordinate) indicated by the machining program from the numerical controller 4. The interfering area calculation unit 18 may temporarily store the information on the calculated interfering area in the storage unit 16.

The work shape data may be continuously the work shape data before machining and may be the work shape data that changes with time in the middle of machining.

The abnormality detection unit 20 compares the position of the tool in relation to the work when the machining state determination unit 14 determines that the machine tool 1 is in the machining state and the interfering area calculated by the interfering area calculation unit 18 and detects an abnormality in the machine tool 1 when there is a contradiction (for example, a difference) in the comparison result. Specifically, the abnormality detection unit 20 detects an abnormality in the machine tool 1 when the position of the tool in relation to the work when it is determined that the machine tool 1 is in the machining state (the periods T1, T2, T3, and T4 in the example of the load torque in FIG. 3) is not in the interfering area. In this way, the abnormality detection unit 20 can detect such a contradiction that a machining load is large in a region which is not the machining area (the interfering area).

The display unit 22 displays an alarm or a message when the abnormality detection unit 20 detects an abnormality in the machine tool 1. The display unit 22 is a liquid crystal display, for example. The display unit 22 may not necessarily be provided.

The abnormality detection device 10 (excluding the storage unit 16 and the display unit 22) is configured as an arithmetic processor such as a digital signal processor (DSP) or a field-programmable gate array (FPGA), for example. Various functions of the abnormality detection device 10 are realized by executing predetermined software (program) stored in the storage unit 16, for example. Various functions of the abnormality detection device 10 may be realized by the cooperation of hardware and software and may be realized by hardware (electronic circuit) only.

As described above, according to the abnormality detection device 10 of the machine tool of the present embodiment, the position (for example, a machine coordinate) of the tool in relation to the work when it is determined that the machine tool is in the machining state on the basis of the load of the spindle 2s and the feed axis 2f and the interfering area (for example, a machine coordinate) of the tool in relation to the work calculated on the basis of the work shape data and the tool shape data stored in advance are compared with each other, and an abnormality in the machine tool 1 is detected when there is a contradiction in the comparison result. In this way, it is possible to detect an abnormality in the machine tool 1 (that is, wrong work shape data or tool shape data is input, the work or the tool is attached to a wrong position, or a wrong work or tool is attached) before interference (collision) between the tool and the work occurs and to correct the error. Due to this, interference between the tool and the work is suppressed so that deterioration or destruction of the spindle 2s or the feed axis 2f is suppressed or prevented more reliably.

Moreover, according to the abnormality detection device 10 of the machine tool according to the present embodiment, an alarm or a message is displayed when an abnormality in the machine tool 1 is detected. In this way, an operator can detect an abnormality in the machine tool 1 (that is, wrong work shape data or tool shape data is input, the work or the tool is attached to a wrong position, or a wrong work or tool is attached) more reliably before interference between the tool and the work occurs.

Hereinabove, the embodiment of the present invention has been described, the present invention is not limited to the above-described embodiment but various changes and modifications can be made. For example, in the above-described embodiment, the abnormality detection unit 20 detects an abnormality in the machine tool 1 when the position of the tool in relation to the work when the machining state determination unit 14 determines that the machine tool 1 is in the machining state is not in the interfering area calculated by the interfering area calculation unit 18. However, the feature of the present invention is not limited thereto, and the abnormality detection unit 20 may detect an abnormality in the machine tool 1 when the position of the tool in relation to the work when the machining state determination unit 14 determines that the machine tool 1 is not in the machining state (periods other than the periods T1, T2, T3, and T4 in the example of the load torque in FIG. 3) is in the interfering area calculated by the interfering area calculation unit 18.

In this way, the abnormality detection unit 20 can detect such a contradiction that a machining load is small in a region which is the machining area (the interfering area) when the tool is destroyed and becomes shortened, for example. In this way, an operator can detect an abnormality in the machine tool 1 (that is, wrong work shape data or tool shape data is input, the work or the tool is attached to a wrong position, a wrong work or tool is attached, or a destroyed tool is attached) more reliably before interference between the tool and the work occurs.

Moreover, in the above-described embodiment, the abnormality detection device 10 of a machine tool that performs cutting has been illustrated. However, the feature of the present invention is not limited thereto but can be applied to an abnormality detection device of a machine tool that performs various machining operations using a spindle and a feed axis.

Moreover, in the above-described embodiment, the abnormality detection device 10 of a machine tool that rotates the tool with the aid of the spindle 2s has been illustrated. However, the feature of the present invention is not limited thereto but can be applied to an abnormality detection device of a machine tool that rotates a work with the aid of a spindle (a machine tool that performs machining of a columnar or cylindrical work).

Moreover, in the above-described embodiment, the display unit 22 has been illustrated as means for notifying an operator of the fact that the abnormality detection unit 20 has detected an abnormality in the machine tool 1. However, such a notification means is not limited thereto. For example, the notification means may be a light emitting unit such as one or a plurality of LEDs. When one LED is used, different pieces of information may be notified using turning on/off and blinking on/off, for example. Moreover, when a plurality of LEDs is used, different pieces of information may be notified using different colors or the number of turned-on LEDs for the same color. Furthermore, for example, the notification means may be a sound generating unit that generates a buzzer sound or a voice.

EXPLANATION OF REFERENCE NUMERALS

1: Machine tool
2s: Spindle
2f: Feed axis
4: Numerical controller
6s, 6f: Servo controller
10: Abnormality detection device
12: Load monitoring unit
14: Machining state determination unit
16: Storage unit
18: Interfering area calculation unit
20: Abnormality detection unit
22: Display unit

What is claimed is:

1. An abnormality detection device of a machine tool including a spindle that rotates a tool or a work and a feed axis that moves the tool or the work, the abnormality detection device comprising:
a processor configured to
monitor a load of at least one of the spindle and the feed axis;
determine that the machine tool is in a machining state when the monitored load of at least one of the spindle and the feed axis is equal to or larger than a threshold for a predetermined period or more after a rising edge of the monitored load equals or exceeds the threshold;
store, in a memory, shape data of the work and shape data of the tool in advance;
calculate an interfering area in which the tool interferes with the work on the basis of the shape data of the work and the shape data of the tool; and
detect an abnormality in the machine tool by comparing, when the machine tool is determined to be in the machining state, a position of the tool in relation to the work with the calculated interfering area.

2. The abnormality detection device of the machine tool according to claim 1, wherein the load monitored is a load torque value applied to the spindle or the feed axis, or a motor driving current value of the spindle or the feed axis.

3. An abnormality detection device of a machine tool including a spindle that rotates a tool or a work and a feed axis that moves the tool or the work, the abnormality detection device comprising:
a processor configured to
monitor a load of at least one of the spindle and the feed axis;
determine that the machine tool is in a machining state when the monitored load of at least one of the spindle and the feed axis is equal to or larger than a threshold;
store, in a memory, shape data of the work and shape data of the tool in advance;
calculate an interfering area in which the tool interferes with the work on the basis of the shape data of the work and the shape data of the tool; and
detect an abnormality in the machine tool by comparing, when the machine tool is determined to be in the machining state, a position of the tool in relation to the work with the calculated interfering area,
wherein the detection of an abnormality in the machine tool is when the position of the tool in relation to the work, when the machine tool is determined to be in the machining state, is not in the calculated interfering area.

4. The abnormality detection device of the machine tool according to claim 1, wherein
the processor is further configured to detect an abnormality in the machine tool by comparing, when the machine tool is determined not to be in the machining state, the position of the tool in relation to the work with the calculated interfering area, and
the detection of an abnormality in the machine tool is when the position of the tool in relation to the work, when the machine tool is determined not to be in the machining state, is in the calculated interfering area.

* * * * *